(12) United States Patent
Cook

(10) Patent No.: US 7,922,559 B2
(45) Date of Patent: Apr. 12, 2011

(54) COMPOSITIONS AND METHODS FOR THE TREATMENT AND MANAGEMENT OF BEE HIVES AND THE BEES THEREIN

(76) Inventor: Ernest C. Cook, Pine Village, IN (US)

( * ) Notice: Subject to any disclaimer, the term of this patent is extended or adjusted under 35 U.S.C. 154(b) by 803 days.

(21) Appl. No.: 11/829,366

(22) Filed: Jul. 27, 2007

(65) Prior Publication Data

US 2008/0026674 A1 Jan. 31, 2008

Related U.S. Application Data

(60) Provisional application No. 60/820,541, filed on Jul. 27, 2006.

(51) Int. Cl.
*A01K 51/00* (2006.01)
(52) U.S. Cl. .......................................................... 449/2
(58) Field of Classification Search .................. 449/2, 3, 449/32, 35, 37
See application file for complete search history.

(56) References Cited

U.S. PATENT DOCUMENTS

| | | | | |
|---|---|---|---|---|
| 2,446,346 | A | * | 8/1948 | Stoller ............................ 449/37 |
| 4,277,492 | A | * | 7/1981 | Daniel et al. ................... 514/576 |
| 4,646,377 | A | * | 3/1987 | Ritter ................................. 449/2 |
| 4,659,739 | A | * | 4/1987 | Yoshioka et al. ............. 514/555 |
| 4,876,265 | A | | 10/1989 | Schmid |
| 4,965,287 | A | * | 10/1990 | Stendel et al. ................ 514/531 |
| 6,037,374 | A | | 3/2000 | Kochansky et al. |
| 6,096,350 | A | | 8/2000 | Kemp et al. |
| 6,646,014 | B2 | | 11/2003 | Watkins |

* cited by examiner

*Primary Examiner* — Tien Dinh
*Assistant Examiner* — Michael Kreiner
(74) *Attorney, Agent, or Firm* — Edward R. Sowers; Brannon Sowers Hughel PC

(57) ABSTRACT

Compositions and methods for managing bee colonies to prevent a variety of diseases, infestations and generally improve the health and productivity of the colony are provided. Such diseases may arise from a variety of sources, including bacteria, fungi, viruses, protozoa and parasites that infest the colony and the hive. Representative diseases preventable or treatable by this compositions and methods disclosed herein include, but are not limited to Foulbrood, Chalkbrood, and Nosema. Examples of infestations treatable and preventable by the compositions and methods disclosed include acarids or mites and insects such as hive beetles and the like. The compositions of the present invention include neutral or acidic solutions of an aromatic sulfonic acid, aqueous salt solutions, and wood sealants. Methods disclosed herein include applying the aqueous compositions to an interior surface of a bee-hive, suspending hive frames by novel corrosion resistant brackets that minimize the absorption of moisture within the hive body and provide bees access to more of the hive's interior for policing, cleaning and housekeeping purposes. The novel brackets and honey produced by bees administered one or more compositions of this invention are also disclosed.

16 Claims, 4 Drawing Sheets

COMPOSITIONS AND METHODS FOR THE TREATMENT AND MANAGEMENT OF BEE HIVES AND THE BEES THEREIN

This application claims the benefit of U.S. Provisional Patent Application Ser. No. 60/820,541 filed on Jul. 27, 2006, which is incorporated herein by reference in its entirety.

TECHNICAL FIELD

The present disclosure relates generally to a method for the management of bee hives, particularly hives managed for the production of honey. The method is capable of controlling infestations of insects and acarids harmful to the hive and the prevention and/or treatment of diseases in honey bees, honey bee larvae and honey bee hives. Insects controlled include hive beetles and wax moths, acarids controlled include a variety of mites such as for example Varroa and Tracheal mites, diseases controlled include Chalkbrood, Foulbrood, and Nosema.

BACKGROUND

The honey bees in America and in Europe are various races of *Apis mellifera*. Other related species worldwide used for honey production include *Apis cerana, Apis dorsata* and *Apis florea*. There are numerous diseases and infestations threatening honey bee families, and thus their honey production. These diseases and infestations arise from many sources, including bacteria, fungi, protozoa, insects and mites. The ones responsible for the greatest economic losses are: Foulbrood-American and European (bacteria), Chalkbrood (fungus), Nosema (protozoan), and Varroa (mite).

American Foulbrood, which is found on every continent, is caused by the spores of the bacterium *Bacillus larvae*, which can remain viable indefinitely on beekeeping equipment. It infects the gut of worker, drone and queen larvae and, while it may not destroy a colony in the first year, if left unchecked may ultimately lead to the death of the colony. The main method of treatment is with the antibiotic oxytetracycline, administered in various forms with a sugar carrier. However, there are many problems associated with administration of oxytetracycline, including problems related to stability, antibiotic contamination of the honey, the possibility of killing open brood on the face of brood combs, and unevenness of dosing. European Foulbrood disease is caused by the bacterium Melissococcus pluton, which is fed to the worker, drone and queen larvae by nurse bees. Diseased colonies fail to increase normally so that no surplus honey, in excess of that needed by the colony to survive, is available for the beekeeper. Oxytetracycline is also used for treating such diseased colonies, but the most efficient dosing system for treating American Foulbrood, using Extender Patties, does not work well for this disease.

Chalkbrood disease is caused by the fungus *Ascosphaera apis*, which primarily infects larvae of workers and drones. Infected larvae become overgrown with a white cotton-like mycelium and eventually dry to a hard, white or gray shrunken mass (thus the name Chalkbrood) referred to as a mummy. The fruit-bodies of the fungus develop on the gray-colored mummies, and the spores released from the spore capsules can enter the air of the beehive. This prompts repeated infection of the developing brood through feeding by the cleaning bees. As a result of infection, the colonies fail to grow to a sufficiently large size, their resistance becomes impaired and their honey-producing capacity decreases to a degree depending on the severity of the mycotic infection.

The disease is prevalent in the entire temperate zone, spreading apparently from southeastern Europe westward. Massive outbreaks have occurred since 1990 in Hungary, where infection rates of 90-100% are common in certain apiaries. There, the infected bee colonies were not able to produce enough honey, and on many occasions beekeepers found empty hives. No chemotherapeutic agent is available for the control of this disease. Chlorine gas has been investigated, but it fails to kill the spores. The most promising approach to control Chalkbrood is to maintain populous colonies to make up for losses in honey, as well as to use stocks that show evidence of resistance to the organism. A related infection, Stonebrood disease (forming stone-hard larvae) is caused by the fungus *Aspergillus flavus* and related species. These are common organisms, and difficult to eliminate.

While the above bacterial and fungal diseases affect the larvae of honey bees, the protozoan Nosema disease, caused by the microsporidian *Nosema apis* Zander, is by far the most widespread of the adult honey bee diseases. The symptoms of Nosema disease are often confused with other causes, and infect individual honey bee workers in many ways. The life span of infected bees is reduced, and can fall to 22%-44% of normal. Also the infected nurse bees are less able to feed brood. Honey bee death rates exceed birth rates, leading to reduced nectar collection and depressed honey yields. Fumigation of empty hives with ethylene oxide and acetic acid has been used to reduce contamination, as has thermal sterilization of hive equipment. The only chemotherapeutic agent that has shown some success, of the many tested, is fumagillin, administered in a sugar syrup.

The parasitic honey bee mites *Acarapis woodi* (Acariosis) and *Varroa jacobsoni* (Varroasis), which are found on every continent except Australia, also affect adult honey bees. The mites are difficult to detect, and their discovery in 1921 and the concern over the potential impact on beekeeping in the United States led to enactment of the Honeybee Act of 1922, which restricted the importation of honey bees from countries where the mites were known to exist. When over 30% of the bees in a colony becomes parasitized with mites, honey production is reduced, as is the likelihood of winter survival.

The deficiency of safe and reliable treatments for many of these diseases, affecting both bee larvae and adults is a major problem for those that depend on bees for pollination of their crops and for the production of honey. A significant improvement in the survival of bee larvae and the extension of the life span of adult bees would be of great value to the beekeeping industry, allowing more bees to make more trips to gather nectar, pollen, water and propolis, thus ensuring greater honey production. Accordingly, there is a need in the art for improved compositions and methods for managing bee hives that provide for effective control of harmful insects, protozoa, mites and the like, for controlling and treating infections in honey bees, such as Foulbrood and Chalkbrood Diseases and for generally maintaining the bees in a generally clean and dry environment and in a healthy condition. The present disclosure fulfills these needs and provides further related advantages.

SUMMARY

In brief, this disclosure is directed to methods of managing a bee hive, compositions utilized therein and a novel frame bracket useful for preventing and/or treating diseases and infestations associated with honey bees, honey bee larvae and/or honey bee hives. Such diseases and infestations may arise from a variety of sources, including bacteria, fungi, viruses, protozoa, parasites and insects. Representative diseases which are preventable or treatable by the compositions and methods of this disclosure include Foulbrood, Chalkbrood and Nosema. Aspects of the present disclosure include:

(a) a method for treating honey bee hives, comprising applying to the hive an effective amount of an aqueous composition comprising an aromatic sulfonic acid in its acid or salt form, optionally with a inorganic acid;

(b) a method for treating honey bee hives, comprising applying to the hive an effective amount of an aqueous composition comprising an aqueous salt solution, such as for example an aqueous solution of sodium chloride;

(c) a method for treating the body of hives constructed of wood or wood-derived products with a wood-sealing composition that reduces the ability of the hive body to absorb water, thus minimizing both fungal and bacterial growth within the hive and reducing deterioration of the hive body;

(d) a method for suspending frames within a hive utilizing novel hive brackets resistant to corrosion and constructed to provide bees substantial access around the bracket and deny insects a haven to escape from the reach of bees and a protected place to lay their eggs;

(e) a novel corrosion resistant hive bracket comprising a bracket constructed of a corrosion resistant material, such as for example, stainless steel, that minimizes protected space behind the bracket for insects to hide and/or lay their eggs;

(f) an improved method of providing a vegetable oil and sugar composition useful for combating tracheal mites;

(g) a method for supporting beehives that provides a barrier to crawling insects; and (h) a novel bee hive and bracket combination utilizing the corrosion resistant bracket described above. These and other aspects of the present disclosure will become apparent upon reference to the detailed description that follows.

DESCRIPTION

Figure 1:
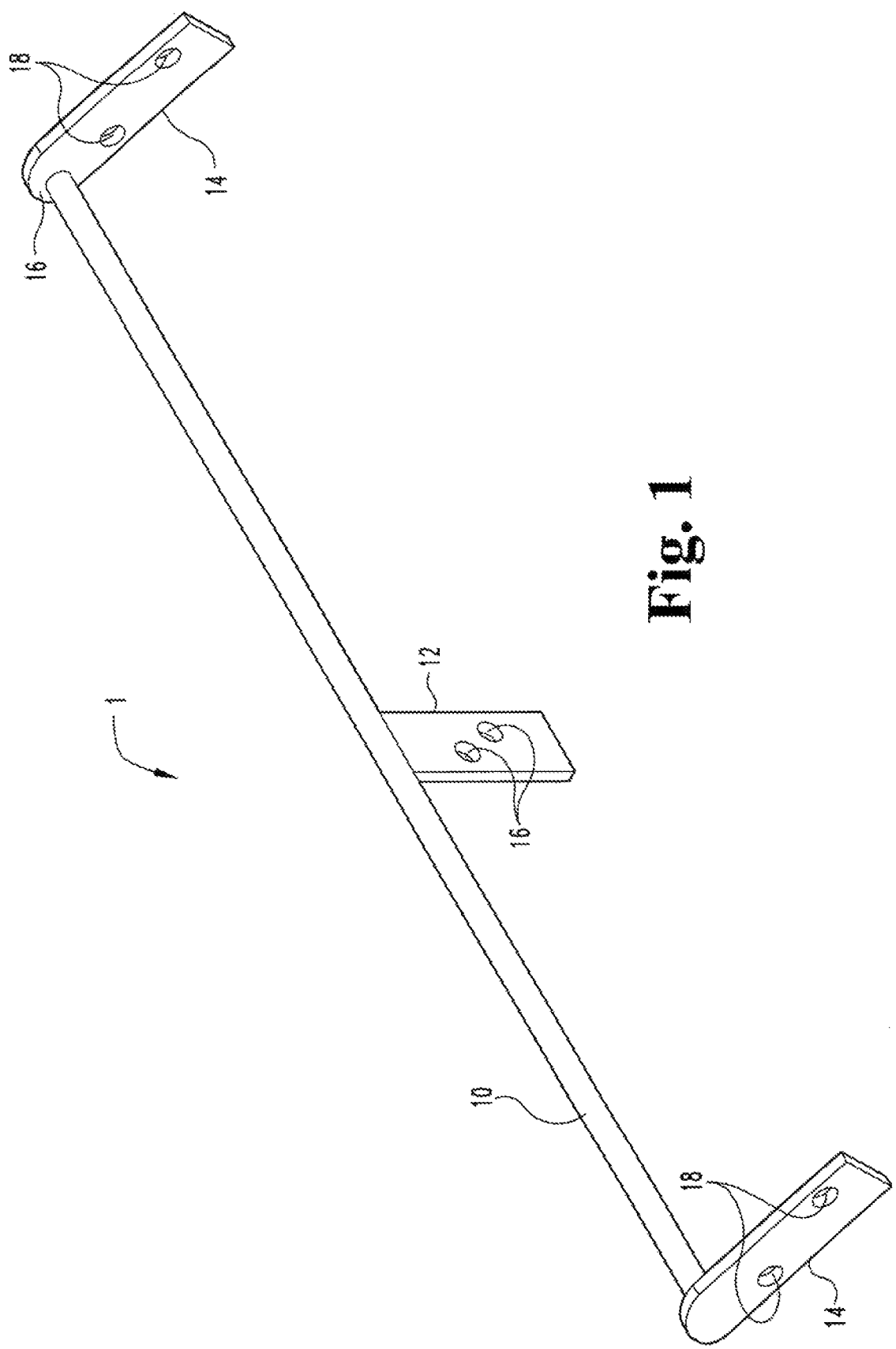
FIG. 1 illustrates a view of an embodiment of the novel hive bracket.

As noted above, the present disclosure is generally directed to compositions and methods for the prevention and/or treatment of diseases in honey bees, honey bee larvae and/or honey bee hives arising from various bacterial, fungal, viral, protozoal and parasitic sources. Such sources cause a variety of diseases, including Foulbrood (American and European), Chalkbrood, Nosema, Acariosis, Varroasis and Sacbrood disease. These diseases can afflict either the larval stage or the adult stage of the honey bee.

One composition of this disclosure is an aqueous solution comprising an aromatic sulfonic acid and/or its acid salt. Preferred aromatic sulfonic acids are substituted with an alkyl group substituted on the aromatic ring. The most preferred aromatic sulfonic acid is dodecylbenzenesulfonic acid. Optionally the compositions may further comprise an inorganic acid. A preferred inorganic acid is phosphoric acid.

In the context of the present disclosure, an aromatic sulfonic acid in its acid and/or its acid salt form includes an un-neutralized aromatic sulfonic acid, a neutralized aromatic sulfonic acid converted to its salt form or mixtures thereof. This complete range of compositions is efficacious in managing bee hives according to the present disclosure when used according to the methods provided herein.

With regard to inorganic acids, such acids include (but are not limited to) acids such as sulfuric, hydrochloric, nitric and phosphoric acid and mixtures thereof.

Those of ordinary skill in the art will recognize that the concentration of the aromatic sulfonic acid utilized can vary, depending inter alia upon the whether the composition is sprayed directly on living bees and upon the volume of the composition utilized in the treatment of the hive. Generally, more dilute solutions of the aromatic sulfonic acid (or its salt) and the optional inorganic acid are preferred when treatment includes contact with living honey bees. Generally, for the treatment of the hive body and contact with living honey bees, concentrations of the aromatic sulfonic acid ranging from about 0.002 to about 0.10 wt % are preferred and when utilized, concentrations of the inorganic acid of from about 0.01 to about 0.3% are similarly preferred.

Aqueous solutions of salt utilized to treat a bee hive can range from about 1 to about 15 wt %, while concentrations ranging from about 4 to about 10 wt % are preferred. Application of salt solutions having concentrations within about this range controls hive beetles at a level sufficiently low to be adequately managed by a healthy honey bee population. A preferred salt is sodium chloride and its most preferred form is a canning or pickling salt lacking an iodide source or any other additives.

The aqueous compositions of this disclosure may be applied to a surface of the bee-hive by any appropriate means known to those skilled in the art. A preferred application is by spraying, using a spray bottle or a pump. In this practice of the application, the aqueous solution of an aromatic sulfonic acid is applied directly to a hive frame. The frame, any brood present and any bees present are preferably wetted with the aqueous sulfonic acid composition. The salt solution can be sprayed onto the hive body, live bees and generally all areas of the hive, except that contact with the hive frame and brood should generally be avoided. The salt solution is preferably sprayed into the interior entrance to the hive to wet the surfaces likely traversed by insects and the like. The number of applications of the aromatic benzene sulfonic acid and/or the salt solution depends on the severity of infestation in the hive and surroundings. In a typical season it generally proves efficacious to apply the aqueous aromatic sulfonic acid at intervals of about every 3 to 5 weeks. If a problem is detected, such as the darkening of the hive interior or unusual activity of bees within a particular hive, application of the sulfonic acid solution as often as about every 5 to 12 days has proven effective. The salt solution is typically applied at intervals of about every 5-12 days. Of course, those skilled in the art can find that different application rates and concentrations are effective, depending on current conditions and location.

Because wood is normally hygroscopic and capable of adsorbing moisture from the atmosphere, hive bodies treated with a wood sealing product that minimizes the ability of the hive body to adsorb water provides a dry interior for the bee colony to work and live. The dry environment makes the interior of the hive easier to be maintained in a clean condition and prevents bacterial and fungal growth. Hive bodies that are made from wood or wood-derived materials can be sealed by introducing a paraffinic material into the wood or wood-derived material that makes up the hive body and/or its removable parts. The paraffinic material can be introduced by treating the hive body with: (a) a solution of the paraffinic material dissolved in an organic solvent; (b) an emulsion of the paraffinic material in water; or directly applying melted paraffin wax onto the wood or wood-derived surface. Solutions and emulsions of paraffinic materials can be obtained in the form of commercial water-sealers. Other paraffinic materials such as canning paraffin, candle wax and the like can be obtained from establishments that sell canning or craft materials.

When bee-hives are first opened in the spring or when new hives are first obtained, it is advisable to first paint the exterior of the hive with an exterior paint and seal the interior surfaces with a wood-sealing product. It is then advisable to thoroughly wet the interior of the hive and its removable parts with the aqueous solution of the aromatic sulfonic acid and treat the entry surfaces to the hive and the regions around the frames with the aqueous salt solution. After stocking the hive, continued treatment, as described above, should be continued as needed to maintain an insect, parasite and disease free hive. Although contact of live bees with the solution of the aromatic sulfonic acid has proven beneficial, contact of live bees with a concentrated salt solution should be avoided to the extent possible.

In general, with populated hives, the compositions can be applied at any time during the day. However, for the beekeeper's safety and comfort, application is preferred during a time the bees are in a generally relaxed or quiet state.

Figure 2:
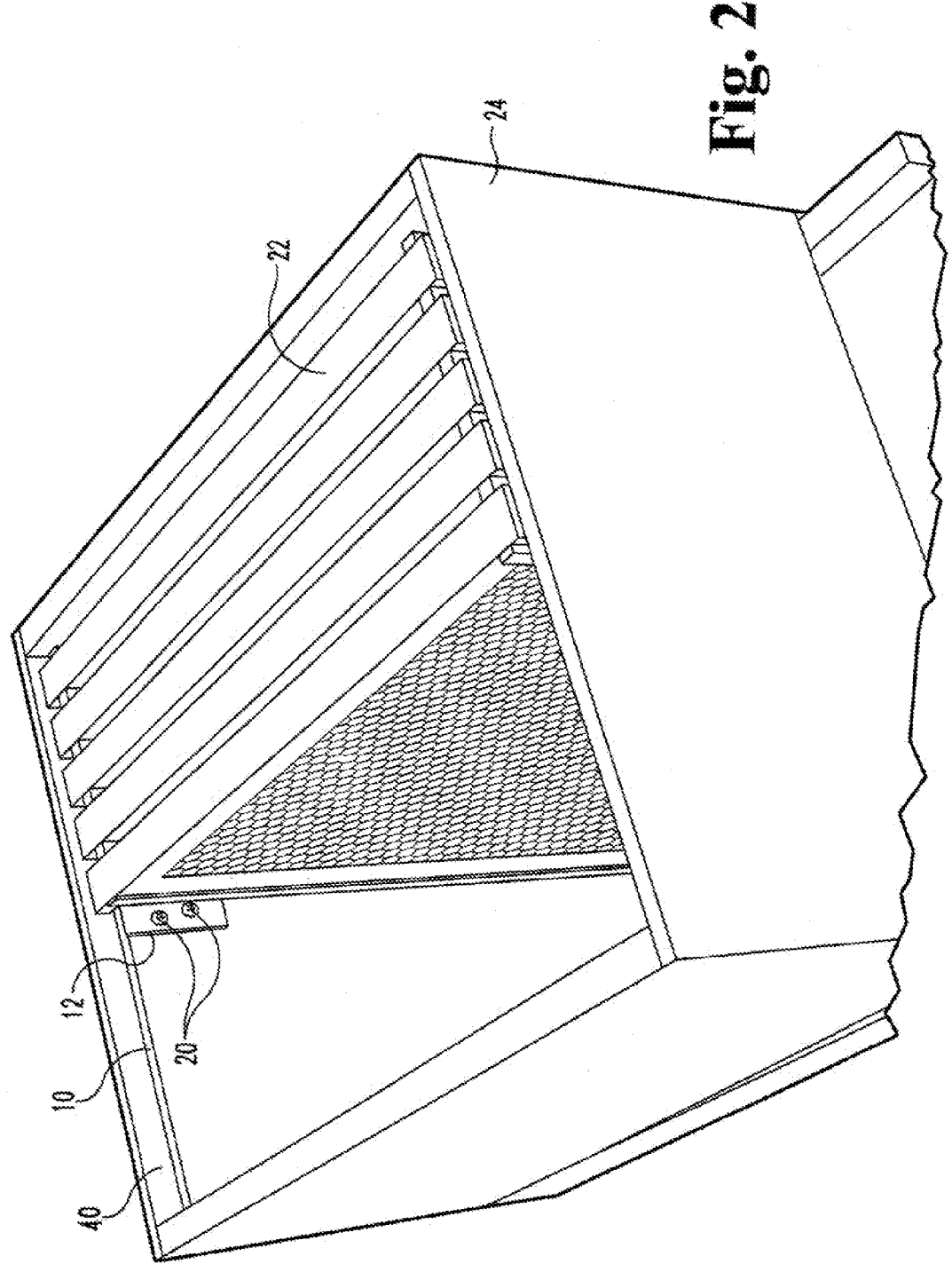
FIG. 2 illustrates a view of an embodiment of the novel hive bracket installed within a beehive supporting several frames.

Management of a bee hive in an insect and disease free condition is further facilitated through the use of a novel bracket for suspending frames within the hive. As illustrated in FIG. 1, preferred bracket 1 comprises a supporting rod 10 having at least two mounting members 14 attached to the ends of the rod and optionally one mounting member 12 along the rod. The rod and supporting member(s) are preferably constructed of a corrosion-resistant material, such as for example, stainless steel. The bracket is adapted to fit within a hive body in the conventional location near an interior surface bridging two opposing internal surfaces. Mounting members 12 and 14 have orifices 18 for accepting a fastener such as for example a screw to secure the rod to the inner hive wall. The rod is positioned on the mounting member(s) to provide a clearance between the rod and the adjacent wall of the hive body of from about 5/16 to about 7/16 of an inch. A spacer region 40 of the mounting member can be sized to position the rod at the proper distance from the wall. Alternatively, a separate spacer can be inserted between the wall and the mounting member to achieve the desired clearance. Two hive brackets are required to support a plurality of frames within a single hive body. FIG. 2 illustrates hive frames 22 suspended within a hive body 24 on novel bracket 1. Bracket 1 is held in place with screws 20 inserted through orifices 16 and 18 (FIG. 1). The required clearance between the bracket's rod and the wall of the hive body provides bees with access of more of the interior of the hive and allows air to circulate better throughout the hive's interior. Additionally, the bracket's non-corrosive properties prevent the formation of corrosion products that are hygroscopic causing the accumulation of moisture between the corroding bracket and the hives inner surface. Each of these features improves hygiene within the hive and provides an environment less favorable to bacterial and fungal growth.

Figure 3:
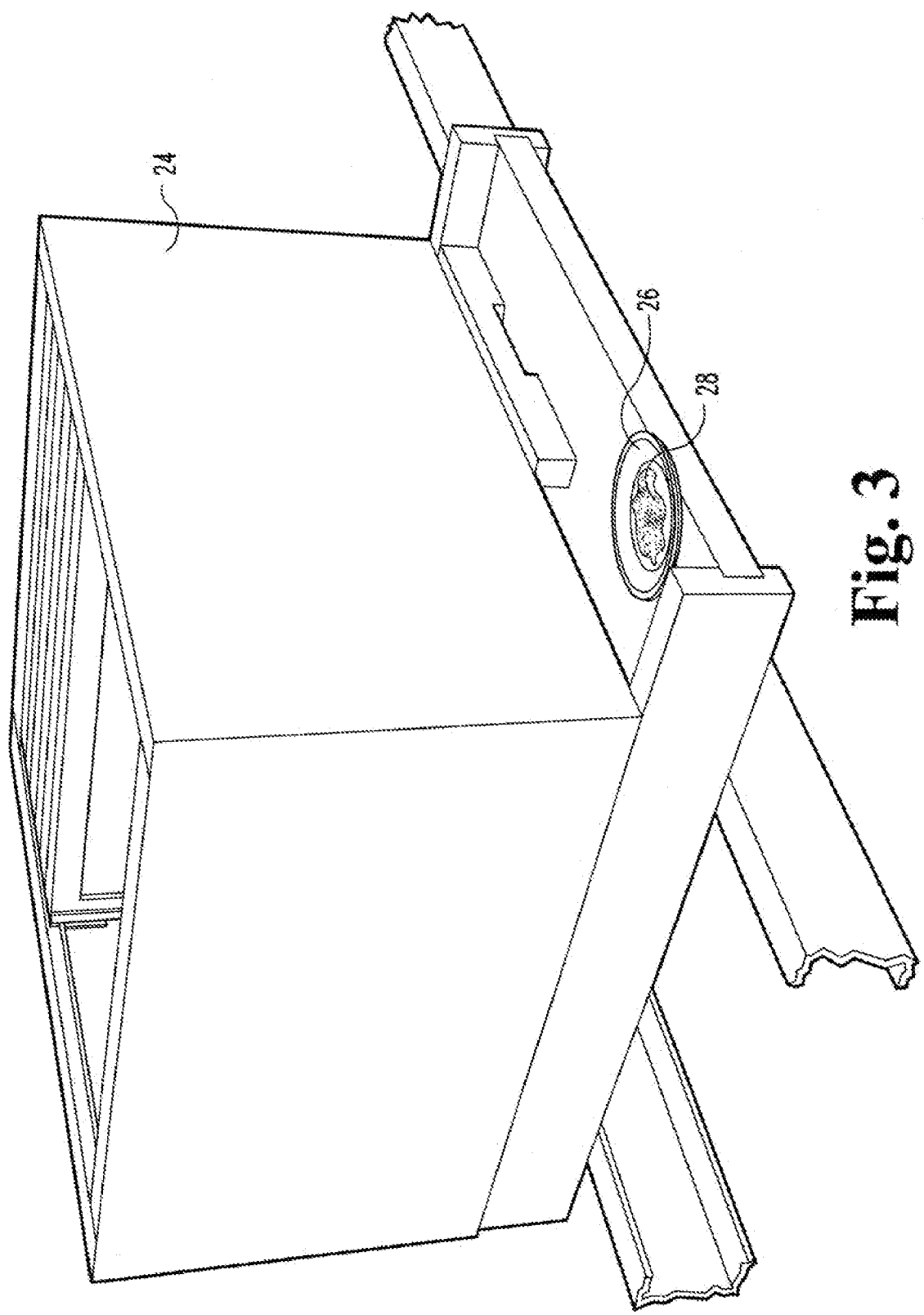
FIG. 3 illustrates a view of a shallow tray containing the preferred vegetable oil/powdered sugar composition place at the opening of a bee hive just prior to being inserted within the hive.

Tracheal mites in bees have traditionally been controlled by providing bees a mixture of vegetable oil and sugar. The mixture is typically formed into patties and placed in the hive. Although the mixture is initially consumed by the bees, consumption of the patty wanes with time and the unconsumed patty becomes an attractant for a variety of insects. A preferred vegetable oil and powdered sugar mixture is prepared and provided on a removable tray sized to easily fit into the hive. Once consumption of the mixture is noted to drop off, the tray is removed and the unused mixture discarded. FIG. 3 illustrates the oil/sugar mixture 28 provided on a removable tray 26.

Figure 4:
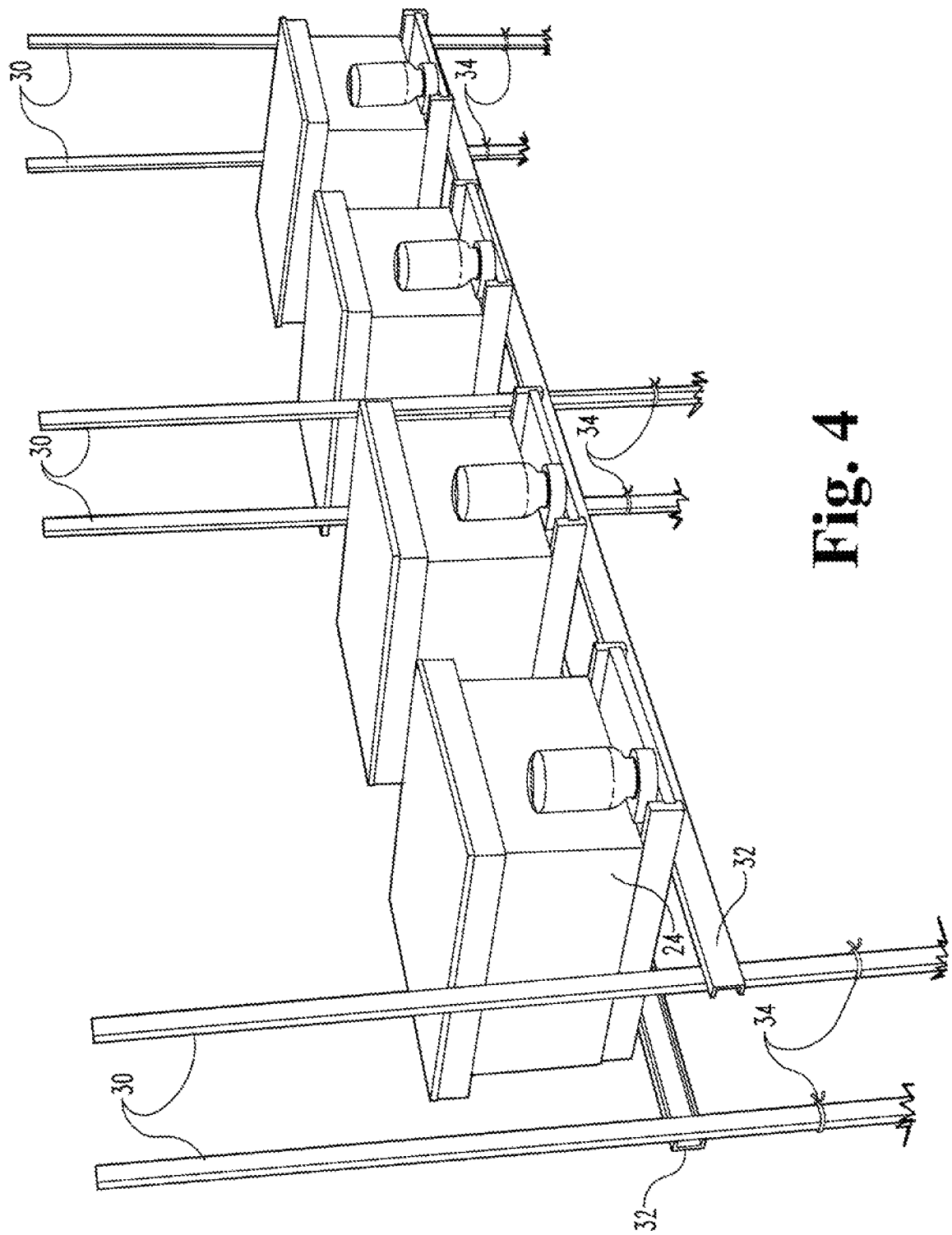
FIG. 4 illustrates a view of a plurality of bee hives supported on a frame attached to steel posts and having a crawling insect barrier on each steel post between ground and the bee hives.

Crawling insects, particularly some varieties of ants and spiders can, upon gaining access to a hive, kill bees and cause a reduction in honey production. FIG. 4 illustrates means for mounting hives 24 on a framework 32 supported by steel posts 30 or other posts having a similar structure and locating a barrier 34 to crawling insects and spiders above the ground, the impact of such pests can generally be avoided. Suitable barriers can be created from a variety of materials such as a porous material soaked with oil, a layer of grease, or a variety of sticky products designed to discourage birds from perching in particular locations.

Improved survival of bees and improved yields of honey can be achieved by implementing any one or a combination of these practices. However, a combination of several or all of the practices provides a maximum survival rate for bees and a maximum honey yield for a given set of conditions.

The present disclosure is illustrated by the following examples, which are to be regarded as illustrative rather than restrictive. Unless otherwise noted, all parts and percentages in the examples, as well as the specifications and claims, are by weight.

EXAMPLES

Example 1

Treatment of a Bee Hive with a Paraffinic Material

The interior surface of a clean and dry bee hive was treated with a paraffin wax melted and heated to a temperature sufficiently high to allow it to be brushed over the hive body's interior surface. After application of the melted paraffin wax, the treated interior of the hive body was further heated with a heat gun to further drive the paraffin into the wood's surface. The treated hive body was allowed to cool and any excess paraffin was physically removed by scraping or otherwise dislodging the excess paraffin from the surface.

Alternatively, the interior surface of a dry bee hive can be treated with a commercial water sealer based on a solution of paraffinic material in an organic solvent or with a commercial water sealer based on an emulsion of a paraffinic material in water. Treatment of the interior of the hive body is carried out according to the water-sealer's application instructions. Better results are obtained by several treatments to increase the level of paraffinic material in the hive body's interior surface. Although the exterior of the hive body can similarly be treated, painting the exterior with a good quality exterior paint containing a mildew-cide is generally adequate. Sealing the interior surface of the hive reduces the hygroscopic nature of the wood making the normally moist interior of the hive dryer and easier for the bees to maintain in a clean and dry condition. Additionally, treatment of the sealed surfaces with the various aqueous solutions does not wet the wood below its surface facilitating evaporation of the water. Finally, the dry interior of the hive has proven generally resistant to bacterial and fungal growth.

Example 2

Treatment of the Interior of a Bee Hive with an Aqueous Solution of an Aromatic Sulfonic Acid (a) Prior to Introduction of Honey Bees—An aqueous solution was prepared by adding and mixing 2.4 mL of a concentrate with 0.5 gallons of water. The concentrate contained 15 wt % dodecylbenzenesulfonic acid, 50 wt % phosphoric acid and 35 wt % inerts. The aqueous solution was introduced into a pump-type spray bottle and the solution applied as a mist to the interior surface of an empty hive body at a rate sufficient to wet the treated surface. Typically 3-5 sprays with a sprayer (the type of sprayer used with window cleaners) on each surface were sufficient. Drying was facilitated by not immediately reassembling the hive body. If desired, more concentrated solutions of the concentrate can be used on the empty hive bodies, but testing to date has not indicated any advantage to the use of higher concentrations.

(b) After Introduction of Honey Bees—The aqueous solution described above was introduced into a pump-type spray bottle and the solution applied as a mist to the interior surface of the hive body and to brood frames and the honey bees associated with that frame. Typically 3-5 sprays on each surface were sufficient. The treated frame could be re-inserted into the hive immediately or after partial or complete drying. Re-treatment can be prophylactic at a regularly scheduled time or upon determining from inspection that the health of the colony has begun to degenerate. Prophylactic re-treatment at intervals ranging from about 21 days to about 35 days has been preferred.

Solutions utilized in this example can be prepared by combining and mixing the individual components, remembering the need to add the acid to water to avoid a vigorous exothermic reaction. Similarly, formulations containing dodecylbenzenesulfonic acid and phosphoric acid can be diluted to arrive at solutions suitable for use in the method described above. Approximately 100 to 300 mL of solution is typically utilized in treating a single hive body, depending on its size. Treatment with solutions containing aromatic benzenesulfonic acids reduces bacterial and fungal growth and controls the population of mites, protozoa, and viruses within the hive to a level that can be managed by a healthy bee population.

Example 3

Treatment of the Interior of a Bee Hive with an Aqueous Solution of a Salt Solution A stock salt solution was prepared by combining with agitation about 1 cup of salt in about 1 gallon of water. The preferred salt is sodium chloride. The most preferred salt is a form such as a canning or pickling salt that lacks additives such as an iodine source. Once the salt was dissolved, the solution was added to the hand sprayer and sprayed on interior surfaces of the hive body, including, but not limited to the inner edges of the hive body around the frame bracket, the bottom of the hive and the floor of the entry to the hive. Particular care is taken to avoid contacting a significant number of bees or the hives brood with a concentrated salt solution. Control of the spray is facilitated by setting the hand sprayer to deliver a stream of solution rather than a mist or spray of fine droplets. Prophylactic treatment can be carried out about 2-4 times a month during a summer season. More frequent treatment can be carried out if evidence of the beginning of an insect infestation is discovered. Because the hive's interior has been sealed, water from the treatment quickly evaporates leaving a salt film to deter insects. Additionally, because the hive or frame brackets are constructed from a corrosion resistant material, introduction of the salt solution does not corrode the hive or frame bracket. The dried salt film has no detrimental effect on the bees within the hive. Periodic treatment of the interior of a hive with an aqueous salt solution provides for the control of a variety of insect intruders within the hive, including, but not limited to hive beetles. Unused salt solution can be stored for at least one season in a closed glass or plastic container. Although the major effect of the salt treatment is believed to be insect control, bees have been observed collecting droplets of freshly delivered salt solution for reasons not currently understood unless the droplet was viewed as a close source of water.

Example 4

Corrosion Resistant Hive Bracket

Brackets of the type illustrated in FIGS. 1 and 2 and constructed of stainless steel were installed in hives treated internally with melted paraffin as described in Example 1 to provide a generally waterproof interior. Frames were supported on the brackets and bees introduced into the hive. During the honey season, the hive was regularly treated with the solutions described in Examples 2 and 3. Inspection of the bracket and bracket area of the hive on a regular basis illustrated a lack of corrosion of the bracket, a general absence of foreign insects, a light color of the wood in the area immediately adjacent to the bracket and an area generally maintained in a clean condition by the bees. This compares to a normally corroded conventional bracket, evidence of wood deterioration immediately adjacent the bracket and foreign insects that have taken refuge in the deteriorated wood beneath the bracket.

The use of the novel corrosion resistant frame bracket having a design that supports frames and provides substantial access to the space between the bracket and the hive body accomplishes several of the desirable objectives mentioned above. First the corrosion resistant nature of the bracket allows the use of a variety of aqueous compositions, some containing corrosive acids and salts, for treating the interior of the hive without causing corrosion of the bracket. Secondly, the bracket's structure provides bees within the hive substantial access to the internal surface of the hive body behind and around the bracket for housekeeping purposes, to deny insects a haven to escape the reach of the bees and protected place to lay their eggs. Finally, because of the bracket's reduced contact with the interior surface of the hive, regions where moisture can be trapped are minimized.

Example 5

Improved Delivery of a Vegetable Oil/Sugar Composition

A vegetable oil such as Crisco solid shortening and powdered sugar were combined in a ratio of approximately 1:3 by volume and mixed to give a consistency similar to cake icing. About two tablespoons of the mixture were placed on a tray-like object that fit into the hive opening. A can lid was be used. Consumption of the mixture was monitored 2-3 times a week and when consumption dropped off, the material was removed and discarded. After about 2 weeks a fresh sample of the mixture was again offered to the bees and the monitoring/discarding steps repeated throughout the summer.

Example 6

Crawling Insect Barrier

A series of steel posts were driven into the ground to a normal depth to form a rectangular pattern and a wooden frame constructed between the posts about 1 to 1½ feet above the ground to support a plurality of hives. Strips of cloth soaked in motor oil were attached to each post about 3 to 5 inches above the ground. A plurality of bee hives supported on the wooden frames along the pattern of post structure remained free from infestations of crawling insects and spiders. Other barriers can similarly be applied to the steel posts, such as for example sticky compositions designed to prevent birds from perching on surfaces and for ringing fruit trees to protect fruit from insects coming from the ground.

From the foregoing, it will be appreciated that, although specific embodiments of this invention have been described herein for the purpose of illustration, various modifications may be made without departing from the spirit and scope of the invention. Accordingly, the invention is not limited except by the appended claims.

What is claimed is:

1. A method for managing a honey bee colony to prevent injury and disease comprising administering to honey bees, honey bee larvae or a honey bee hive, an effective amount of an aqueous composition comprising an aromatic sulfonic acid in its acid form, wherein said injury and disease arises from a source selected from an insect, a bacteria, a fungi, a virus, a protozoa and a parasite.

2. The method of claim 1, wherein said administering involves administering a composition further including an inorganic acid.

3. The method of claim 2 wherein said disease is American Foulbrood or European Foulbrood.

4. The method of claim 2 wherein said disease is Chalkbrood.

5. The method of claim 2 wherein said disease is Nosema.

6. The method of claim 2 wherein said disease is Varroasis or Acariosis.

7. The method of claim 2 wherein said disease is Sacbrood Disease.

8. The method of claim 2 wherein said administering involves administering an aqueous composition containing a benzene sulfonic acid.

9. The method of claim 8 wherein said administering involves administering an aqueous composition containing an inorganic acid selected from the group consisting of sulfuric acid, hydrochloric acid, nitric acid, phosphoric acid, and mixtures thereof.

10. The method of claim 9, wherein said administering involves administering an aqueous composition containing phosphoric acid.

11. The method of claim 2 wherein said administering involves administering and aqueous composition containing an inorganic acid present in an amount ranging from about 0.005% to 10% by weight of the composition.

12. The method of claim 11 wherein said administering involves administering an aqueous composition containing an aromatic sulfonic acid present in an amount ranging from 0.1% to 2% by weight of the composition.

13. The method of claim 2, wherein said administering involves administering to said honey bee hive, and further comprises administering an aqueous solution of an inorganic chloride salt to at least a portion of an entry surface of said honey bee hive to prevent injury from hive beetles.

14. The method of claim 13, wherein said administering an aqueous solution of an inorganic chloride salt involves administering an aqueous solution of sodium chloride.

15. The method of claim 2, wherein said administering involves administering to said honey bee hive and said honey bee hive contains at least one frame suspended upon a bracket, comprising a metal rod positioned along an upper region of an external wall of said hive, said rod positioned at least about 5/16 of an inch from said internal wall and maintained in position by at least two mounting members attached to said rod and fastened to an internal wall.

16. The method of claim 15, wherein said metal rod is constructed of stainless steel.

* * * * *